(12) United States Patent
Abraham et al.

(10) Patent No.: US 9,357,565 B2
(45) Date of Patent: May 31, 2016

(54) MULTI-USER UPLINK COMMUNICATION USING EDCA WITH POLLING

(75) Inventors: Santosh Paul Abraham, San Diego, CA (US); Hemanth Sampath, San Diego, CA (US); Simone Merlin, San Diego, CA (US); Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 13/043,314

(22) Filed: Mar. 8, 2011

(65) Prior Publication Data
US 2011/0268054 A1 Nov. 3, 2011

Related U.S. Application Data

(60) Provisional application No. 61/312,116, filed on Mar. 9, 2010.

(51) Int. Cl.
*H04W 72/04* (2009.01)
*H04W 74/06* (2009.01)
*H04W 72/12* (2009.01)

(52) U.S. Cl.
CPC .......... *H04W 74/06* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2003/0053480 A1 | 3/2003 | Jang et al. | |
| 2004/0156351 A1* | 8/2004 | Kim | 370/349 |
| 2005/0002355 A1 | 1/2005 | Takano | |
| 2005/0030964 A1* | 2/2005 | Tiedemann et al. | 370/431 |
| 2005/0272423 A1* | 12/2005 | Stephens et al. | 455/434 |
| 2009/0141680 A1 | 6/2009 | Becker | |
| 2009/0232112 A1 | 9/2009 | Trainin et al. | |

(Continued)

FOREIGN PATENT DOCUMENTS

| | | |
|---|---|---|
| CN | 1512725 A | 7/2004 |
| CN | 1853374 A | 10/2006 |

(Continued)

OTHER PUBLICATIONS

International Search Report and Written Opinion—PCT/US2011/027782, ISA/EPO—May 19, 2011.

(Continued)

*Primary Examiner* — John Blanton
*Assistant Examiner* — Alan Lindenbaum
(74) *Attorney, Agent, or Firm* — Joseph Hanasz

(57) ABSTRACT

Simultaneous, multi-user uplink communication is scheduled in a wireless network by transmitting a poll message to a plurality of access terminals in response to receiving a first request to transmit data via uplink. The poll message includes a solicitation for requests to transmit data from each of the plurality of access terminals. The poll message also includes a medium reservation and schedule for transmission of the requests from the access terminals. Based on the requests received from the access terminals, a number of the access terminals are selected for simultaneous transmission of data via uplink. A transmit start message is sent to each of the selected access terminals indicating when and for how long the selected access terminals may transmit data via uplink. After the data is received, a block ACK message is sent to each of the selected access terminals indicating successful simultaneous communication.

37 Claims, 10 Drawing Sheets

(56) References Cited

U.S. PATENT DOCUMENTS

| | | |
|---|---|---|
| 2010/0046453 A1 | 2/2010 | Jones, IV et al. |
| 2010/0157922 A1 | 6/2010 | Kim et al. |
| 2011/0051647 A1 | 3/2011 | Sampath et al. |
| 2011/0158159 A1* | 6/2011 | Gong et al. .................. 370/328 |

FOREIGN PATENT DOCUMENTS

| | | |
|---|---|---|
| EP | 0215523 A1 | 3/1987 |
| EP | 1429496 A1 | 6/2004 |
| JP | 2003179610 A | 6/2003 |
| JP | 2004328570 A | 11/2004 |
| JP | 2010045784 A | 2/2010 |
| JP | 2010130625 A | 6/2010 |
| WO | 2005015844 | 2/2005 |
| WO | 2009027931 A2 | 3/2009 |

OTHER PUBLICATIONS

Taiwan Search Report—TW100107965—TIPO—Nov. 30, 2013.
Tandai T., et al., "An Efficient Uplink Multiuser MIMO Protocol in IEEE 802.11 WLANs", Personal, Indoor and Mobile Radio Communications, 2009 IEEE 20th International Symposium on Sep. 16, 2009, pp. 1153-1157.

* cited by examiner

MULTI-USER UPLINK COMMUNICATION USING EDCA WITH POLLING

CROSS-REFERENCE TO RELATED APPLICATIONS

Claim of Priority Under 35 U.S.C. §119

The present Application for Patent claims priority to Provisional Application No. 61/312,116, entitled "Multi-User Uplink Communication Using EDCA Augmented With Polling" filed Mar. 9, 2010, and assigned to the assignee hereof, and is hereby expressly incorporated by reference herein in its entirety.

BACKGROUND

I. Field

The following description relates generally to communication systems, and more particularly to multiple-user uplink communication in a wireless network.

II. Background

To address increasing bandwidth requirements of wireless communications systems, different schemes are being developed to allow multiple access terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access) protocol. The CSMA protocol attempts to ensure that no more than one transmission occurs during a period of potential high interference. Similarly, the "frequency" dimension of freedom can be exploited by using different frequency channels.

Recent developments have introduced space as a dimension to be exploited to increase, or at least more efficiently use, existing capacity. Spatial Division Multiple Access (SDMA) can improve utilization of the air link by scheduling multiple access terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are access terminals (ATs). The streams are formed such that a stream targeted at AT-B, for example, is seen as low power interference at other access terminals (e.g. AT-C, AT-D, . . . , etc.). Such a targeted stream will not cause significant interference at other ATs and are likely ignored. To form these orthogonal streams, the AP needs to have channel state information (CSI) from each of the receiving ATs. Although CSI can be measured and communicated in several ways, thereby adding complexity, the use of CSI optimizes the configuration of SDMA streams.

Additional complexities arise when MIMO is applied to multi-user (MU) systems. For example, typically, the AP controls the uplink (UL) communication process. However, in certain configurations, uplink scheduling requires that ATs contend with the AP for channel access. In other words, the AP will act as an additional AT trying to gain access to the transmission medium, thereby affecting all ATs attempting to gain access. Further, the ability of the AP to efficiently schedule UL-SDMA traffic depends on knowledge of the amount of uplink data available at ATs to be served. Improvements to current UL scheduling schemes and mechanisms to share information useful for scheduling are desirable.

SUMMARY

According to various aspects, simultaneous, multi-user uplink communication is scheduled in a wireless network by transmitting a poll message to a first plurality of access terminals in response to receiving a first request to transmit data (TxR) from an access terminal. The poll message includes a solicitation for requests to transmit data from each of the plurality of access terminals. Based on the transmit request messages received from a second plurality of access terminals, a number of the second plurality of access terminals are selected for assignment of a simultaneous transmit opportunity. A transmit start message (TxS) is sent to each of the selected access terminals indicating their assignment to the simultaneous transmit opportunity. In some examples, the TxS message indicates when and for how long the selected access terminals may simultaneously transmit data via uplink. After data is received from the selected access terminals in accordance with the assignment of the simultaneous transmit opportunity, a block ACK message is transmitted to each of the selected access terminals indicating successful simultaneous communication.

In one aspect, an access point may direct the poll message to access terminals selected based at least in part on their participation in a previous TxOP. For example, if an AT was regularly part of previous uplink schedules, an AP may direct the poll message to that AT. In another example, if the AT did not respond to a previous poll message, an AP may not direct the poll message to that AT on the assumption that the AT has no traffic to transmit via uplink. In another example, if the AT responded to a previous poll message, an AP may direct the poll message to that AT on the assumption that the AT has traffic to transmit via uplink.

In another aspect, the poll message includes a duration field indicating a time reservation during which transmit request messages from the access terminals should be received. In one example, the duration field includes a value sufficient to reserve the medium for the time it will take to complete the polling process. In this manner, communications from other access terminals will not be permitted to interfere with the polling process. In some examples, the duration field of the poll message is set to a maximum backoff count.

In another aspect, the poll message includes a schedule indicating when each of the access terminals is to respond with a transmit request message. In this manner, a mechanism exists to schedule the transmission of the TxR messages solicited from each AT. In some examples, a fixed schedule may be communicated to each AT that separates each TxR message in time such that there are no collisions. For example, the schedule may indicate fixed points in time, each allocated to a particular AT. In another aspect, a deterministic backoff parameter may be assigned to each AT such that the responses of each AT are sequentially ordered in time. Each AT sets their respective backoff counters to the backoff count specified in the poll message. Each AT then contends for access to the medium in the conventional manner using the assigned backoff count.

In another aspect, the poll message may include a specification of priority class or set of priority classes of data that will be considered for uplink communication. For example, some levels of communication specified in EDCA (commonly referred to as Access Categories) may be excluded from consideration for uplink communication for a particular TxOP. The limitations may be adjusted for each TxOP in any manner suitable to meet the objectives of the communication system. In this manner, the priority class of data associated with a TxR message from an AT is controlled by the contents of the poll message.

In another aspect, each TxR message may indicate any of an amount of data for which uplink communication is requested, a priority class of the data for which uplink communication is requested, an amount of data in queue awaiting uplink transmission, an AT identifier, and a poll identifier indicating that the TxR message is responsive to a particular poll message. In addition, each TxR message may include any of training symbols that AP 402 may use to estimate the uplink channel, the time required for the transmission, TxTime, an indication of one or more requested durations, and a Modulation and Coding Scheme (MCS) indication.

In another aspect, an AP selects a group of access terminals for which simultaneous uplink communication will be allowed. The selection may be based on any of 1) the amount of data to transmit as reported by the AT, 2) the amount of data in a queue of the AT, which indicates the size of the queue remaining at a particular AT, 3) a priority class of the data to be transmitted, and 4) the TxOP duration requested.

In another aspect, a transmit start message (TxS) is sent to each of the selected access terminals indicating an assignment of each selected AT to the TxOP. The TxS message may include any of an indication of a spatial stream (SS) assigned to each of the selected ATs, a modulation and coding rate assignment to each of the selected ATs, a time duration for data transmission by the selected ATs, a priority class of data permitted to be transmitted by each of the selected ATs, power offset values for each of the selected ATs, and a list of ATs allowed to transmit data in the TxOP.

In another aspect, the TxS message may include an acknowledgement of TxR messages received by the AP, but were not selected to be served in the scheduled TxOP. In some examples, the AP stores an indication of the unserved TxR messages. After receiving data from the selected ATs in accordance with the assignment of the first scheduled TxOP and transmitting a block ACK message to each of the selected ATs based at least in part on the received data, the AP contends for access to the medium and sends another TxS message to another plurality of ATs. The TxS message indicates an assignment of another TxOP for each of the ATs, including the ATs not selected for assignment of the previously scheduled TxOP (i.e., the unserved TxR messages). In some other examples, AP 402 transmits another TxR poll, receives additional TxR messages, and generates another TxS message that includes a transmission opportunity for the previously unserved TxR messages.

In another aspect, a poll message is received from an AP, the poll message including a solicitation for a request to transmit data via uplink to the AP. A time to transmit a transmit request message to the AP is determined at least in part from a schedule indicated by the poll message. A transmit request message is transmitted at the determined time. A TxS message is received from the AP indicating an assignment of a simultaneous transmit opportunity to transmit data via uplink to the AP. Data is transmitted via uplink to the AP in accordance with the assignment of the simultaneous transmit opportunity. A block ACK is received from the AP based at least in part on the transmitted data.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative of but a few of the various ways in which the principles of various aspects may be employed and the described aspects are intended to include all such aspects and their equivalents

DETAILED DESCRIPTION

Various aspects of the novel systems, apparatus and methods are described more fully hereinafter with reference to the accompanying drawings. The teachings of this disclosure may, however, be embodied in many different forms and should not be construed as limited to any specific structure or function presented throughout this disclosure. Based on the teachings herein one skilled in the art should appreciate that that the scope of disclosure is intended to cover any aspect of the systems, apparatus and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Figure 1:
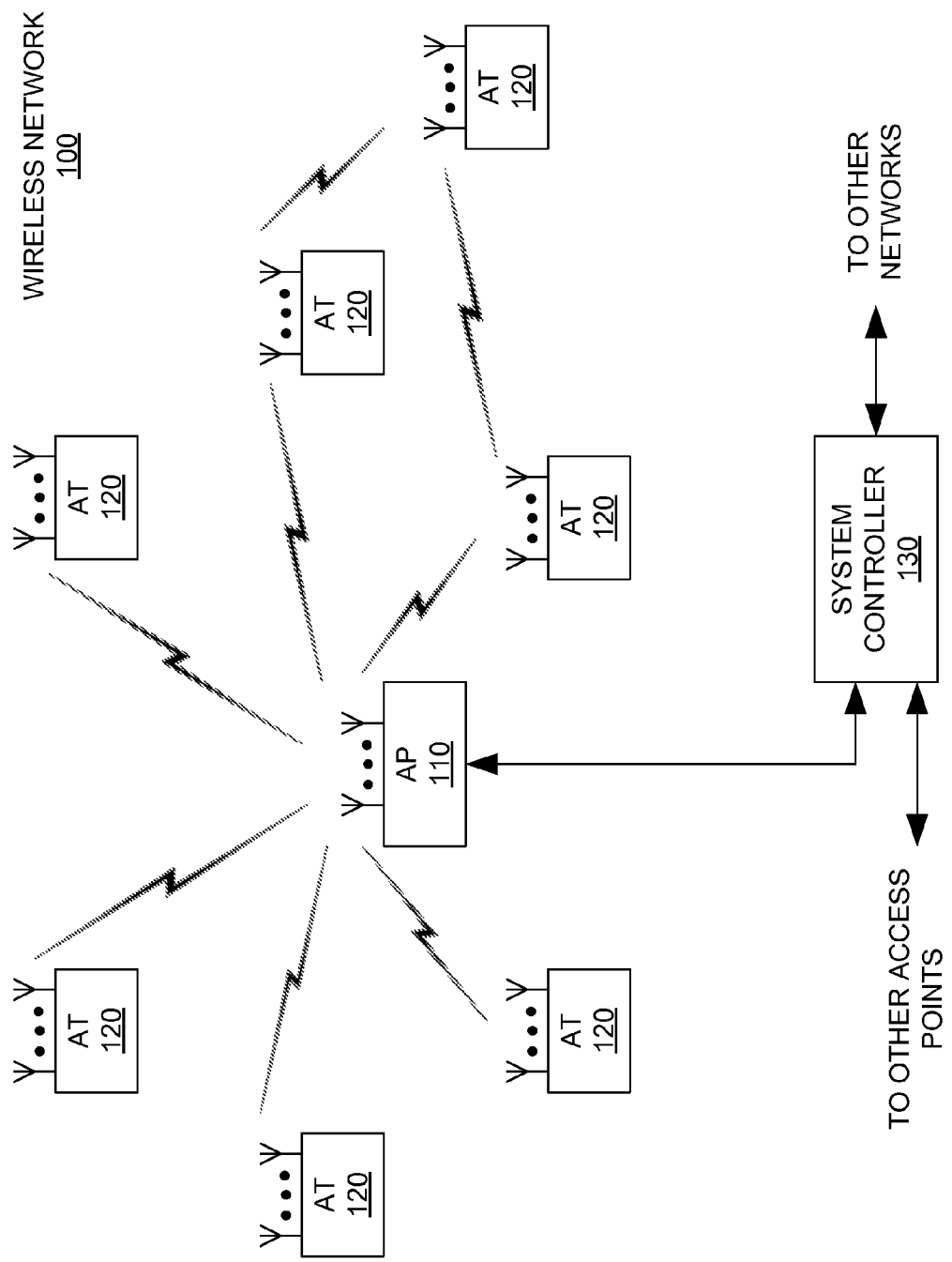
FIG. 1 is a diagram of a wireless communications network configured in accordance with an aspect of the disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals (ATs) or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. As depicted, access terminals 120 may be spatially separated. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme that enables multiple streams sharing the same frequency channel to be simultaneously transmitted to different receivers. This provides higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. In this configuration, for example, multiple antennas at an access terminal 120 may be used to communicate with a multiple antenna access point 110 to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure describe access terminals that support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC layer decides to transmit, it provides a block of MAC packets to the PHY layer. The PHY layer assembles a PHY packet by assembling the block of MAC packets into a payload and adding a preamble. The PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer. The MAC layer checks the error detection code for each MAC packet to determine whether it was successfully decoded. If the error detection code for a MAC packet indicates that it was successfully decoded, then the payload for the MAC packet is provided to the application layer. If the error detection code for a MAC packet indicates that it was unsuccessfully decoded, the MAC packet is discarded. A Block Acknowledgement (BA) may be sent back to the transmitting node indicating which data packets were successfully decoded. The transmitting node uses the BA to determine which data packets, if any, require retransmission.

Figure 2:
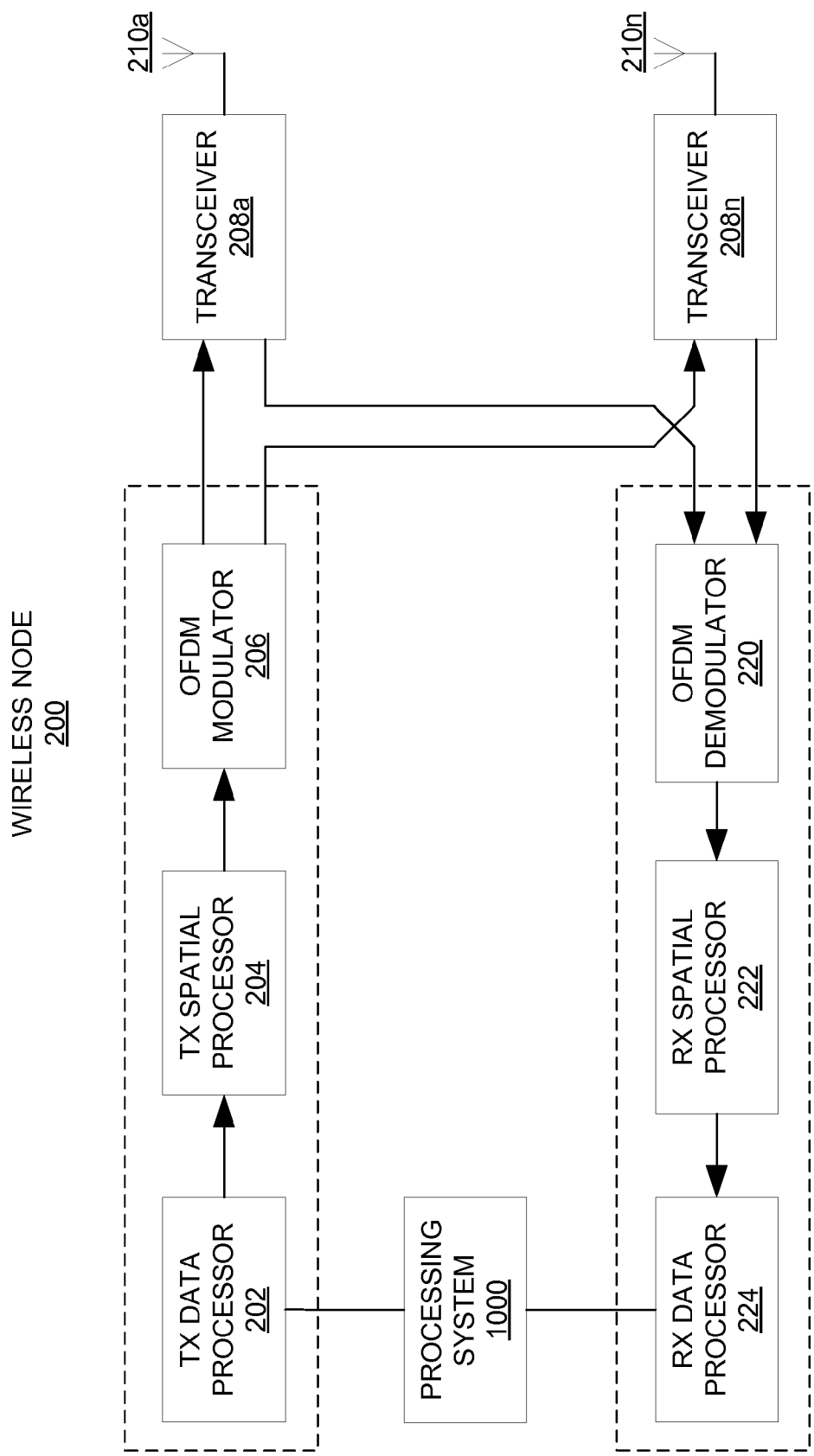
FIG. 2 is a wireless node that includes a front end processing system in a wireless node in the wireless communications network of FIG. 1.

FIG. 2 is a conceptual block diagram illustrating an example of the signal processing functions of the PHY layer that may be executed by any of AP 110 and AT 120 illustrated in FIG. 1. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

The modulation symbols from the TX data processor 202 may be provided to a TX spatial processor 204. TX spatial processor 204 performs spatial processing of the modulation symbols. This may be accomplished by spatial precoding the modulation symbols. In wireless nodes implementing OFDM, the spatially precoded modulation symbols are provided to an OFDM modulator 206. OFDM modulator 206 splits the modulation symbols into parallel streams. Each stream is then mapped to an OFDM subcarrier and then combined using an Inverse Fast Fourier Transform (IFFT) to produce a time domain OFDM stream. Each spatially precoded OFDM stream is then provided to a different antenna 210a-210n via a respective transceiver 208a-208n. Each transceiver 208a-208n modulates an RF carrier with a respective precoded stream for transmission over the wireless channel.

In a receive mode, each transceiver 208a-208n receives a signal through its respective antenna 210a-210n. Each transceiver 208a-208n may be used to recover the information modulated onto an RF carrier. In wireless nodes implementing OFDM, each transceiver 208a-208n may provide the information to an OFDM demodulator 220. The OFDM demodulator 220 converts the stream (or combined stream) from time-domain to the frequency domain using a Fast Fourier Transform (FFT). The frequency domain signal comprises a separate stream for each subcarrier of the OFDM signal. The OFDM demodulator 220 recovers the data (i.e., modulation symbols) carried on each subcarrier and multiplexes the data into a stream of modulation symbols before sending the stream to a RX spatial processor 222. RX spatial processor 222 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222. RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs decode the data that was originally transmitted before providing the data to the MAC layer.

In some embodiments, wireless node 200 includes processing system 1000 operable to perform simultaneous, multi-user uplink communication in a wireless network in accordance with the various examples and embodiments presented herein.

Figure 3:
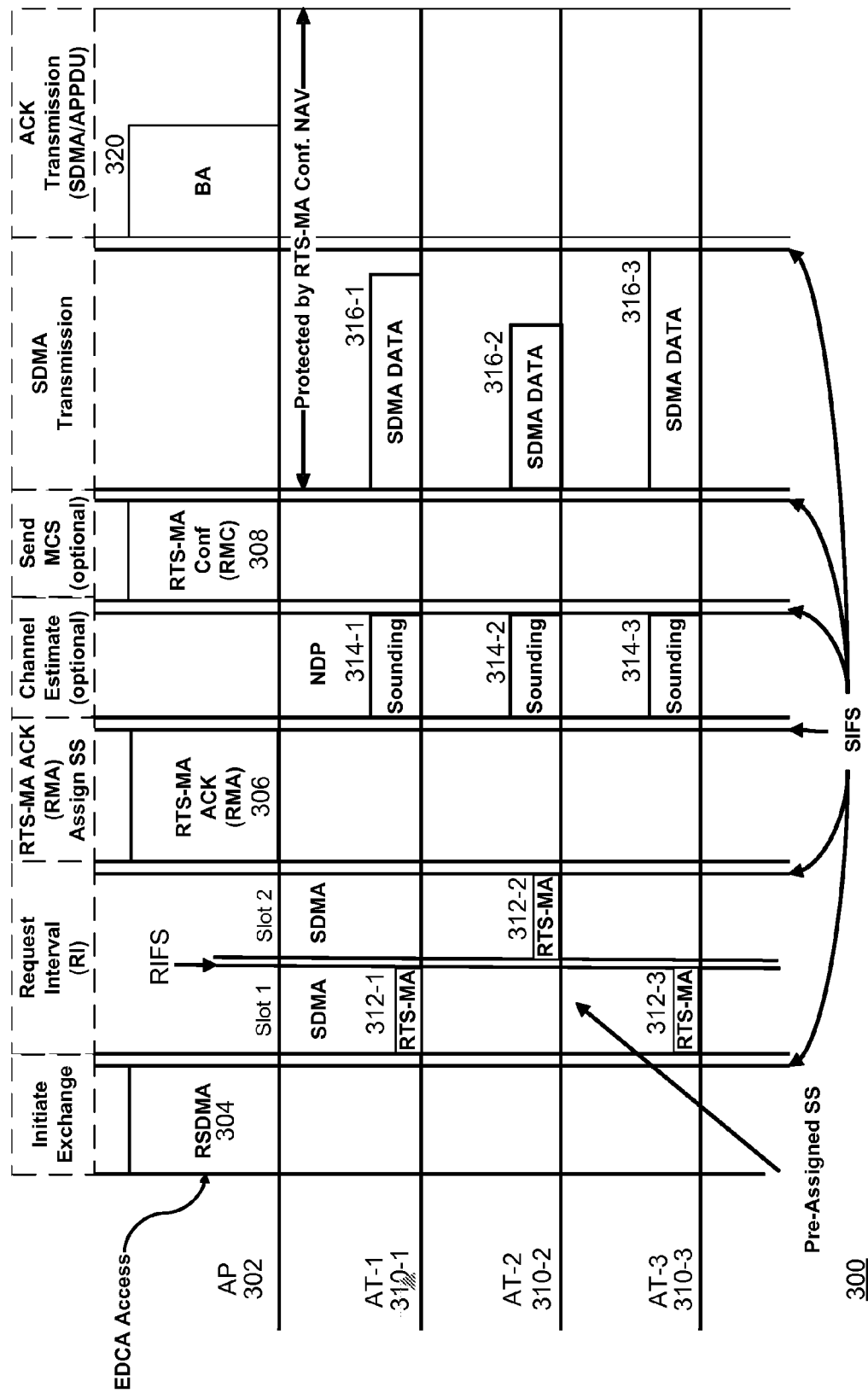
FIG. 3 is a timing diagram illustrating the operation of a traditional Access Point (AP)-initiated UL SDMA frame sequence.

FIG. 3 illustrates a timing diagram 300 that illustrates a traditional sequence for AP-initiated uplink SDMA transmission by an AP 302 with a plurality of ATs 310-1 to 310-3 in one example. The AP 302 gains access to the medium using Enhanced Distributed Channel Access (EDCA). Access is provided based on a priority depending on an uplink traffic Access Category (AC) from the plurality of ATs 310-1 to 310-3. The AP 302 then sends out a Request SDMA (RS-DMA) message 304, requesting clients such as the plurality of ATs 310-1 to 310-3 to send an UL Request To Send-Multiple Access (RTS-MA) message. UL RTS-MA messages are transmitted using pre-assigned time-slots and spatial streams (SS), where the assignment is performed by the AP 302. The plurality of ATs 310-1 to 310-3 respond with respective RTS-MA messages 312-1 to 312-3. Each RTS-MA message contains UL traffic AC, an EDCA backoff counter value and a packet size. The AP 302 may optionally send an RTS-MA-ACK (RMA) message 306, acknowledging the RTS-MA messages 312-1 to 312-3 and requesting sounding for UL SDMA modulation and coding scheme (MCS) calculation purposes. The AP 302 then sends an RTS-MA Confirmation (RMC) message 308 with SS, MCS and any power offset values required for UL SDMA for selected clients. These clients are selected to preserve their EDCA priorities (backoff counter value and AC). The RMC message 308 also reserves the medium for a time period needed to perform a transmission operation, referred to as a TxOP duration. The TxOP duration can be based on longest packet size requested by the selected clients. Clients then send UL SDMA packets; illustrated as SDMA data transmissions 316-1 to 316-3, using the SS, MCS and power offset values as suggested by the AP 302. Once the AP 302 has successfully received the UL SDMA packets, the AP 302 responds with a Block ACK (BA) message 320 to acknowledge the transmission from the clients. After a successful transmission of the UL SDMA packets, the clients may re-initialize their backoff counters for EDCA access. In some examples, the clients may prefer to not use EDCA access for UL traffic and rely on scheduled RSDMA or RTS-MA-Confirmation messages for future UL transmissions.

The above-described AP initiated UL-SDMA scheme can encounter issues in some scenarios. In one example, if the clients re-initialize their backoff counters for EDCA access after UL-SDMA transmission, the AP may still contend for the medium on behalf of other clients that need to send UL traffic even if the AP has no traffic to send. This results in the AP also competing with these clients for medium access. In other words, the AP will act as a "virtual AT". With overlapping basic services sets (OBSS), the number of these "virtual ATs" will increase in the network and lead to an increased number of collisions.

Issues may arise if the clients rely purely on scheduled RSDMA or RMC messages from the AP for scheduling future UL transmission. For example, scheduled access works well for fixed rate traffic such as video or voice over Internet Protocol (VoIP) traffic, but does not extend well to bursty data traffic. In another example, the reliance on AP scheduling messages by the clients in the presence of OBSS with several APs will lead to increased collisions of scheduled RSDMAs. This can be mitigated to some extent, but not completely, using random backoff values. In another example, the AP design is complicated when the AP is solely responsible for scheduling UL SDMA transmissions.

In a client-initiated transmission process, the AP is not aware of the buffer status of the ATs and consequently, the AP does not know which of the ATs need to send data. To address this, the AP may send a poll message (TxR poll) that includes a solicitation for transmit request messages (TxRs) from a number of ATs. In response, the ATs may each send a TxR message to the AP indicating that they want to send data. In response, the AP may grant a transmission opportunity (TxOP) to the ATs by sending a transmit start (TxS) message to selected ATs.

Figure 4:
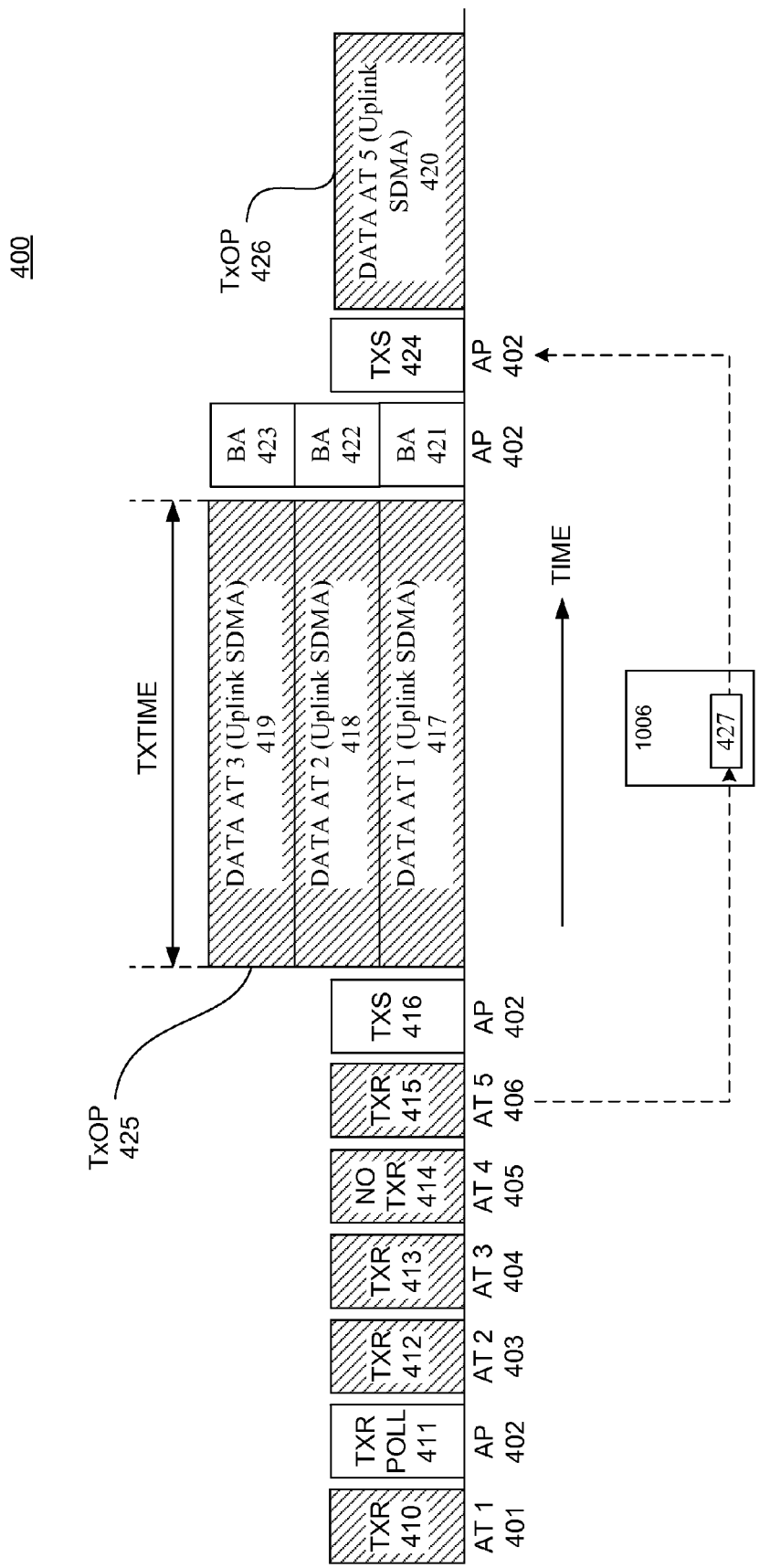
FIG. 4 is a timing diagram illustrating the operation of an access terminal/client-initiated UL SDMA scheme configured in accordance with one aspect of the disclosure.
Figure 5:
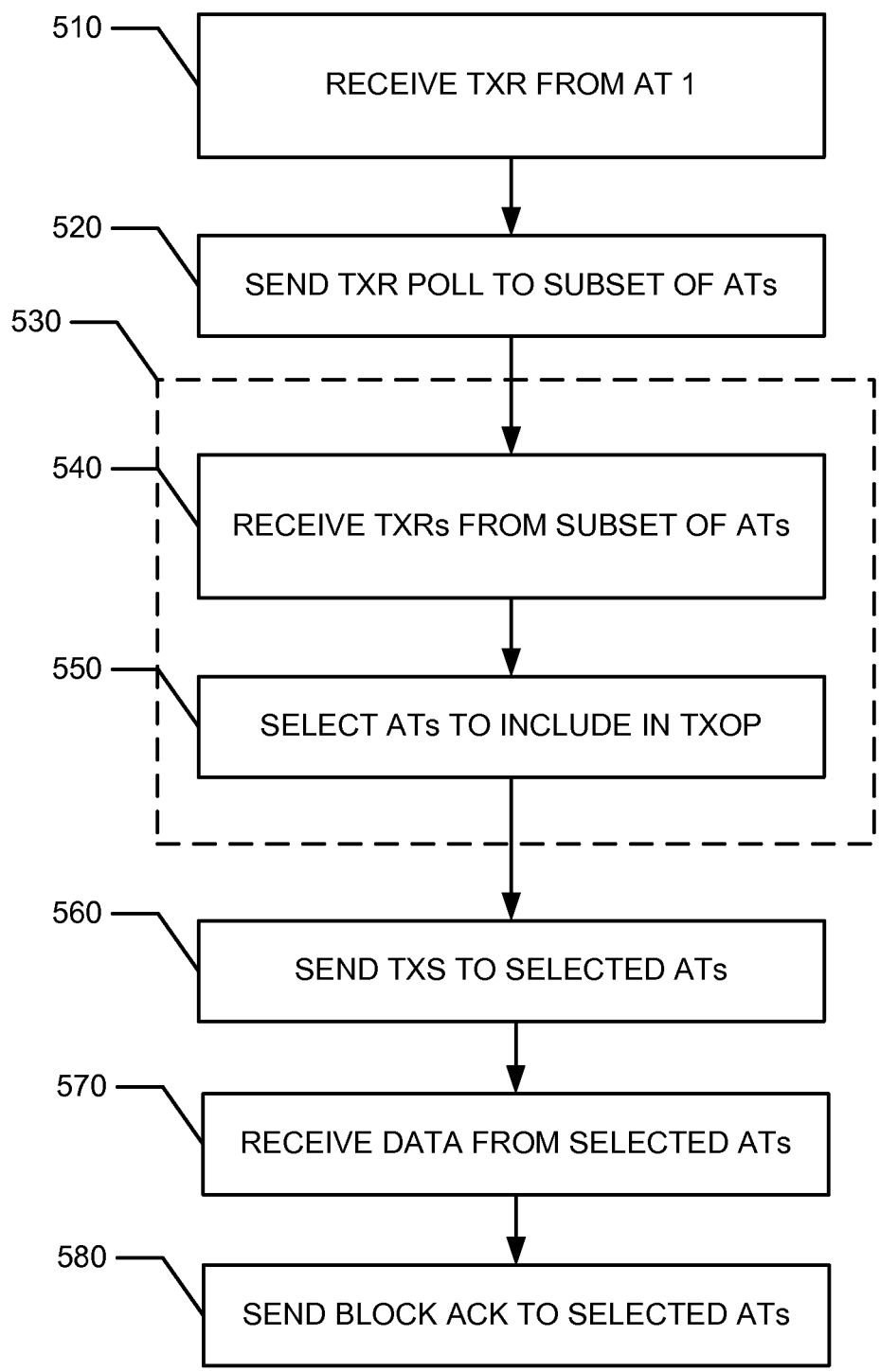
FIG. 5 is a flow diagram illustrating the operation of the access terminal/client-initiated UL SDMA scheme of FIG. 4 configured in accordance with one aspect of the disclosure.

A client initiated SDMA uplink reservation protocol between an AP 402 and a plurality of access terminals (e.g., AT-1 401 to AT-5 406) will be described with reference to a timing diagram 400 as illustrated in FIG. 4, and further with reference to a client initiated UL SDMA process 500 as illustrated by FIG. 5.

At block 510, an AT-1 401 gains access to the medium using EDCA and sends a transmit request message (TxR) 410 to the AP 402. The TxR message 410 may indicate a priority class specification of data to be transmitted. TxR message 410 may include an identifier of AT-1 401. TxR message 410 may also include an amount of data that AT-1 401 wants to transmit via uplink. In addition, TxR message 410 may also include training symbols that AP 402 may use to estimate the uplink channel. The TxR message 410 may also include the time required for the transmission, TxTime. A request from an AT may include an indication of one or more requested durations, where each requested duration is referred to a possible SDMA transmission setting, such as the total number of spatial streams. Each request from an AT may also include a Modulation and Coding Scheme (MCS) indication, referring to the MCS that the AT will be using in relation with the requested transmission duration. From the duration and the requested MCS, the AP may determine the amount of data the AT needs to send.

At block 520, in one aspect of the disclosure, the AP 402 responds to TxR message 410 with a poll message 411 that includes a solicitation for transmit request messages (TxRs) from several access terminals. Four access terminals (AT-2 403 to AT-5 406) are illustrated in FIG. 4 for exemplary purposes. However, any number of access terminals may be contemplated. In some examples, poll message 411 may be targeted to approximately ten access terminals. In some examples, poll message 411 may be broadcast to many more access terminals. However, in such cases, the broadcast message includes the destination addresses of only the access terminals for which the poll message is intended. In other examples, poll message 411 may be individually transmitted to each of the desired access terminals. In many examples, AP 402 directs the poll message 411 to a limited number of access terminals within range to avoid wasteful consumption of available resources. AP 402 may select access terminals to direct the poll message 411 based on any of several factors including the history of previous communications between the AP and the AT. In one aspect, an access point may direct the poll message to access terminals selected based at least in part on their participation in a previous TxOP. For example, if an AT was regularly part of previous uplink schedules, an AP may direct the poll message to that AT. In another example, if the AT did not respond to a previous poll message, an AP may not direct the poll message to that AT on the assumption that the AT has no traffic to transmit via uplink. In another example, if the AT responded to a previous poll message, an AP may direct the poll message to that AT on the assumption that the AT has traffic to transmit via uplink.

In one aspect, the poll message includes a duration field indicating a time reservation during which transmit request messages from the access terminals should be received. In one example, poll message 411 includes a duration field with a value sufficient to reserve the medium for the time it will take to complete the polling process. In this manner, communications from other access terminals will not be permitted to interfere with the polling process. In one example, AP 402 sets the duration field of poll message 411 to encompass a maximum backoff count. In this example, the duration field of the poll message 411 is set to (MaxBackoffCount×slot time). By way of example, the value of slot time in 802.11/a/n/ac is nine microseconds. MaxBackoffCount is specified to be at least the largest backoff count value assigned to any of the ATs solicited by the AP 402 in poll message 411. By assignment of the duration field of the poll message 411 to the maximum amount of time required to receive a TxR message from each of the solicited ATs, the medium is effectively reserved for the polling process because nodes that are not polled are prevented from accessing the medium during this time.

In another aspect, poll message 411 includes a mechanism to schedule the transmission of the TxR messages solicited from each AT. In some examples, a fixed schedule in time may be constructed by AP 402 and communicated to each AT. In this manner, the TxR message transmitted from each AT is coordinated in time such that there are no collisions. In other examples, a deterministic backoff parameter may be assigned to each AT by AP 402 such that the responses of each AT are sequentially ordered in time. This approach may save time by allowing an AT to step in place of an AT that does not send a TxR message without waiting for the entire duration of time allocated to a TxR message to elapse with no transmission. If the poll message includes deterministic backoff parameters assigned to each solicited AT, the ordering of the TxR messages from each of the ATs is based on the assigned backoff parameters. In one example, as discussed above, AP 402 sets the duration field of poll message 411 to encompass the maximum backoff count. In this example, the duration field of the poll message 411 is set to (MaxBackoffCount×slot_time). When soliciting four access terminals, MaxBackoffCount may be four. When an access terminal transmits a TxR message, it sets the duration field of the TxR message to (MaxBackoffCount−ATBackoffCount)×slot time). ATBackoffCount is the deterministic backoff count value assigned by AP 402 to each AT in poll message 411. For example, AT-5 406 may be assigned a ATBackoffCount value of four, AT-4 405 may be assigned a ATBackoffCount value of three, etc. Each AT sets their respective backoff counters to the backoff count specified in poll message 411. Each AT then contends for access to the medium in the conventional manner using the assigned backoff count. In this manner, the order of TxR messages is determined by the assignment of a different ATBackoffCount value for each AT and a lapse in communication of a TxR message from one AT can be filled by a subsequently scheduled AT.

In another aspect, the poll message 411 may include a priority class specification or set of priority class specifications of data that will be considered by AP 402 for uplink communication in the upcoming TxOP. For example, some priority classes of communication specified in EDCA (commonly referred to as Access Categories) may be excluded from consideration for uplink communication for a particular TxOP by excluding them from the set of priority class specifications included in poll message 411. In one example, a priority class of data to be transmitted from an access terminal must match the priority class specification for an access terminal to be considered for assignment of a TxOP. In another example, a priority class of data to be transmitted from an access terminal must either match or exceed the priority class specification for an access terminal to be considered for assignment of a TxOP. The limitations may be adjusted for each TxOP in any manner suitable to meet the objectives of the communication system. In this manner, the priority class of data associated with a TxR message from an AT is controlled by the AP 402 via poll message 411.

At block 540, in one aspect of the disclosure, each of AT-2 403, AT-3 404, and AT-5 406 transmit TxR messages 412, 413, and 415, respectively to AP 402 in response to poll message 411. In various examples, each of TxR messages 412, 413, and 415 may indicate any of 1) an amount of data for which uplink communication is requested, 2) a priority class of the data for which uplink communication is requested, 3) an amount of data in queue awaiting uplink transmission, 4) a station identifier, and 5) a poll identifier indicating that the TxR message is responsive to a particular poll message (e.g., poll message 411). In other examples, TxR messages 412, 413, and 415 may include any of 1) training symbols that AP 402 may use to estimate the uplink channel, 2) the time required for the transmission, TxTime, 3) an indication of one or more requested durations, where each duration is referred to a possible SDMA transmission setting, such as the total number of spatial streams, and 4) a Modulation and Coding Scheme (MCS) indication, referring to the MCS that the AT will be using with the requested transmission duration. From the duration and the requested MCS, the AP may determine the amount of data the AT needs to send.

In the example depicted in FIG. 4, AT-4 405 sends a message 414 to AP 405 indicating that it does not make a request for uplink transmission of data. For example, AT-4 405 may have no data it wishes to transmit to AP 402. As depicted, such an indication may be communicated by explicit message 414. In other examples, AT-4 405 may simply not respond to poll message 411.

After receiving TxR messages 412, 413, and 415, at block 550, the AP 402 selects a group of access terminals for which uplink communication will be allowed. In some examples, all of the access terminals (e.g. all of terminals AT-1, AT-2, AT-3, and AT-5) that respond with a TxR message are selected for participation in a transmit opportunity (TxOP). In some other examples, only a subset of the access terminals that respond with a TxR message are selected for participation in the TxOP. As depicted in FIG. 4, terminals AT-1 417, AT-2 418, and AT-3 419 are selected for TxOP 425. The determination of the participants in the TxOP may be based on any of 1) the amount of data to transmit as reported by the AT, 2) the amount of data in a queue (e.g. queue size) of the AT, which indicates the size of the queue remaining at a particular AT, 3) a priority class of the data to be transmitted, and 4) the TxOP duration requested (e.g., TxTime).

At block 560, a transmit start message (TxS) 416 is sent to each of the selected access terminals indicating an assignment of each selected AT to the TxOP. In one example, TxS message 416 acts as a clear to send (CTS) message to AT-1 401, AT-2 403, and AT-3 404, and reserves the medium for a TxOP 425 of maximum time duration TxTime specified by AP 402. The AP 402 also may also assign spatial stream (SS), modulation and coding values, and power offset values, the assignment of which are optional, for each of AT-1 401, AT-2 403, and AT-3 404 to send UL-SDMA traffic within the TxOP 425. The TxS message 416 may carry a list of ATs allowed to transmit data in the UL-SDMA TxOP, the maximum duration of the data transmission (TxTime), the power level adjustment for each AT, which may be defined based on the stored power from the received TxR message, the total number of spatial streams allocated, a time offset to correct packet transmission start time, as well as an MCS indication per AT or an MCS backoff indication per AT. At block 570, data is simultaneously transmitted from each selected access terminal to AP 402 during a TxOP associated with each access terminal. As depicted in FIG. 4, data 417-419 is simultaneously transmitted from AT-1, AT-2, and AT-3, respectively, to AP 402 during TxOP 425. At block 580, after successfully receiving data 417-419 simultaneously transmitted during the uplink data TxOP 425, a block acknowledgement (ACK) message 421-423 is sent to each served access terminal. As depicted in FIG. 4, AP 402 transmits block ACK messages 421-423 to AT-1 401, AT-2 403, and AT-3 404, respectively.

In another aspect, the TxS message 416 may include an acknowledgement of TxR messages received by AP 402 that were not selected to be served in the scheduled TxOP. As depicted in FIG. 4, in some examples, AP 402 stores an indication of the unserved TxR messages 427 in a memory (e.g., memory 1006). In some examples, upon completing the data reception and transmission of the block ACKs 421-423, AP 402 contends for access to the medium and sends another TxS message 424 that includes a TxOP 426 for the unserved TxR messages (e.g., TxR message 415). In some other examples, AP 402 transmits another TxR poll, receives additional TxR messages, and generates a TxS message that includes a transmission opportunity for both the previously unserved TxR messages and at least some of the additional TxR messages.

Figure 6:
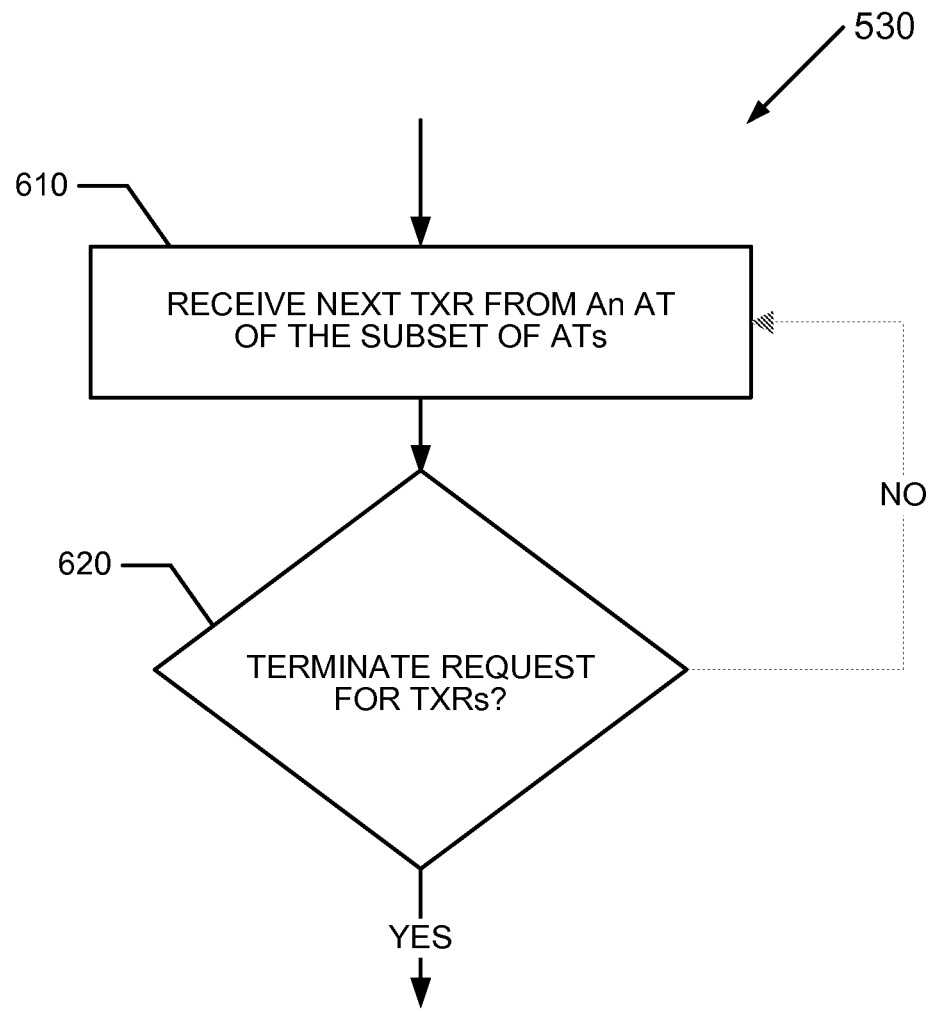
FIG. 6 is a flow diagram illustrating the operation of the access terminal/client-initiated UL SDMA scheme configured in accordance with another aspect of the disclosure.

FIG. 6 illustrates an alternative set of blocks 530 to those depicted in FIG. 5. In the alternative approach, after poll message 411 is transmitted, each TxR message is sequentially received (block 610) and considered for participation in a TxOP. At block 620, AP 402 may determine that no more TxR messages will be considered and terminate the request for TxR messages. For example, AP 402 may receive several TxR messages and then run out of capacity to accommodate the requests (e.g., number of spatial streams allocated reaches the number of antennas at AP 402). In this case, rather than continuing to receive TxR messages without being able to assign them a TxOP, AP 402 elects to stop receiving TxR messages. In this manner, AP 402 can proceed to send a TxS message without further delay.

Figure 7:
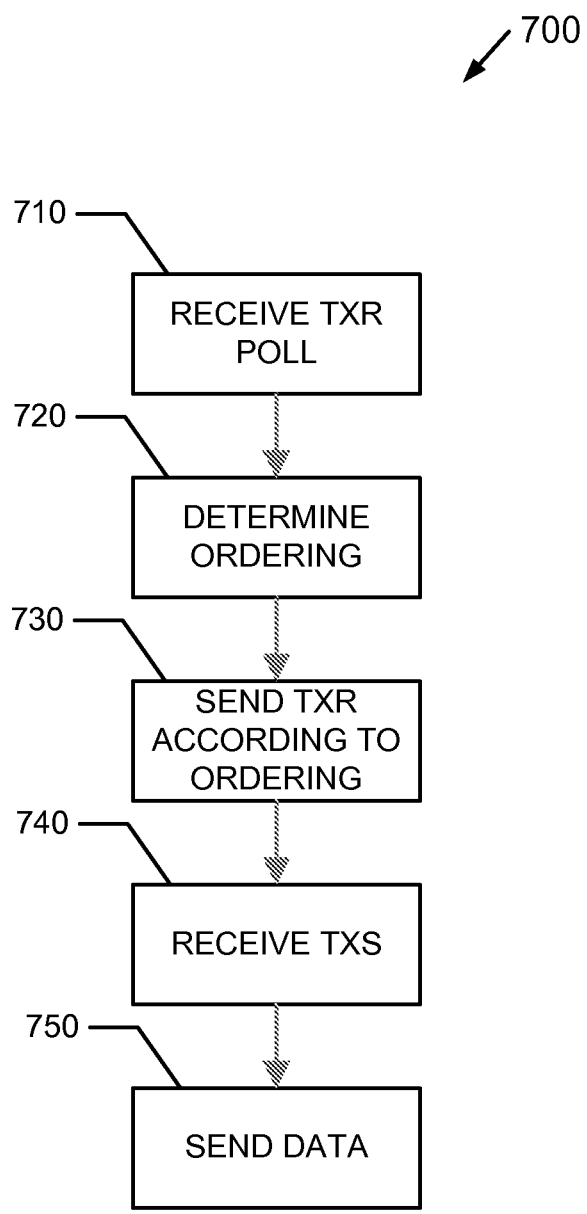
FIG. 7 is a flow diagram illustrating the operation of the AT/client-initiated UL SDMA scheme configured in accordance with another aspect of the disclosure.

The proposed client initiated SDMA uplink reservation protocol between an AP 402 and an access terminal (e.g., AT-2 403) is also described with reference to client initiated UL SDMA process 700 as illustrated by FIG. 7 and with further reference to the timing diagram of FIG. 4.

At block 710, an access terminal (e.g., AT-2 403) receives a poll message 411 from AP 402 including a solicitation for a transmit request message (TxR) from AT-2 403 and soliciting TxR messages from other access terminals (e.g. AT-3 404 to AT-5 406) as discussed in further detail herein.

At block 720, AT-2 403 determines an ordering of the TxR messages solicited by AP 402. If the poll message includes a fixed time schedule, AT-2 403 determines the ordering of the TxR messages based on the time appointed to AT-2 403 in the poll message. If the poll message includes a deterministic backoff parameter assigned to AT-2 403, the ordering of the TxR messages is based on the order of the assigned backoff parameters as discussed in further detail above.

At block 730, AT-2 403 sends a TxR message 412 in accordance with the ordering determined at block 720. In various examples, TxR message 412 may indicate any of an amount of data for which uplink communication is requested, a priority class of the data for which uplink communication is requested, an amount of data in queue awaiting uplink transmission, a station identifier, and a poll identifier indicating that the TxR message is responsive to a particular poll message (e.g., poll message 411). In other examples, TxR message 412 may include any of training symbols that AP 402 may use to estimate the uplink channel, the time required for the transmission, TxTime, an indication of one or more requested durations, where each duration is referred to a possible SDMA transmission setting, such as the total number of spatial streams, and a Modulation and Coding Scheme (MCS) indication, referring to the MCS that the AT will be using with the requested transmission duration. From the duration and the requested MCS, the AP may determine the amount of data the AT needs to send.

At block 740, AT-2 403 receives a TxS message 416 indicating an assignment of a TxOP 425 to AT-2 403. In one example, TxS message 416 acts as a clear to send (CTS) message to AT-2 403 and reserves the medium for a TxOP 425 of maximum time duration TxTime specified by AP 402. The AP 402 also may also assign spatial stream (SS), modulation and coding values, and power offset values, the assignment of which are optional, for AT-2 403 to send UL-SDMA traffic within the TxOP 425. The TxS message 416 may carry a list of ATs allowed to transmit data in the UL-SDMA TxOP, the maximum duration of the data transmission (TxTime), the power level adjustment for each AT, which may be defined based on the stored power from the received TxR message, the total number of spatial streams allocated, a time offset to correct packet transmission start time, as well as an MCS indication per AT or an MCS backoff indication per AT. At block 750, AT-2 403 sends data 418 to AP 402 during the TxOP 425 assigned to AT-2 403 by AP 402 and communicated to AT-2 403 in TxS message 416. Data 418 is transmitted by AT-2 403 at the same time as data 417 is transmitted by AT-1 401 and data 419 is transmitted by AT-3 404.

Figure 8:
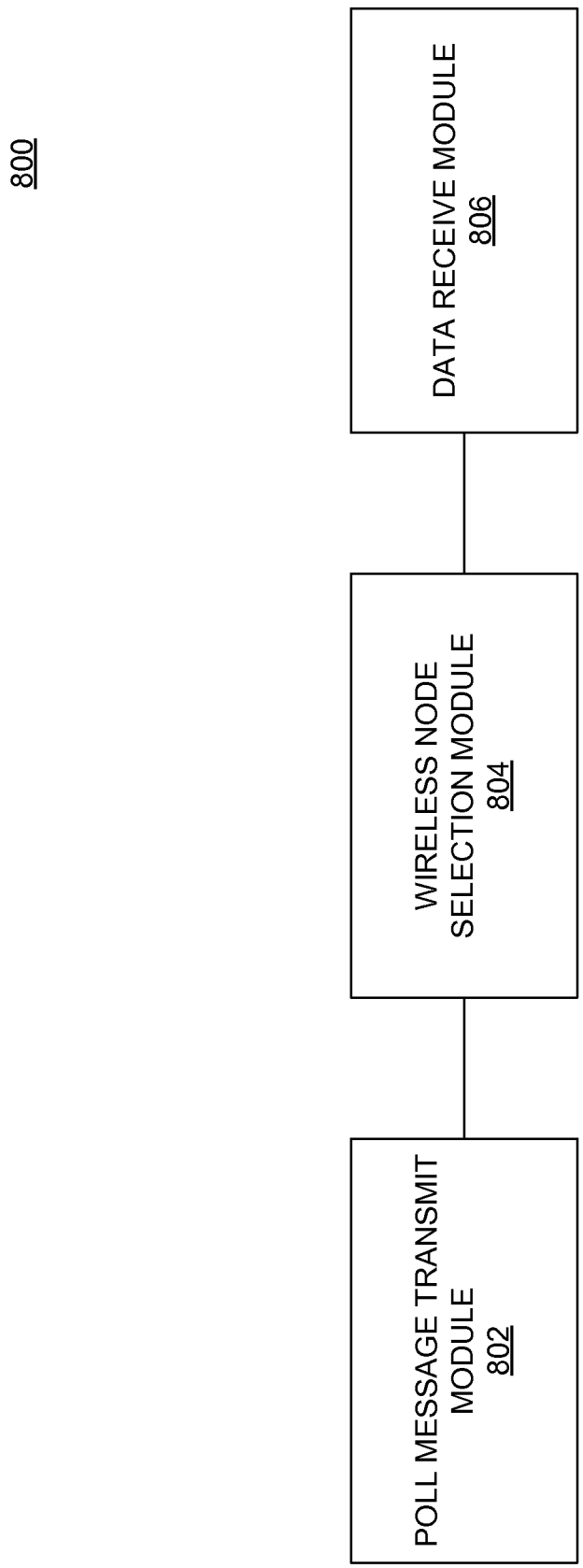
FIG. 8 is a block diagram illustrating the functionality of an access point apparatus for implementing a client-initiated UL scheme with a plurality of ATs in accordance with one aspect of the disclosure.

FIG. 8 is a diagram illustrating the functionality of an access point apparatus 800 in accordance with one aspect of the disclosure. The apparatus 800 includes a poll message transmit module 802 for transmitting a poll message to a plurality of wireless nodes soliciting requests to transmit via uplink; a wireless node selection module 804 for selecting a group of wireless nodes to be assigned a transmission opportunity based at least in part on requests to transmit received in response to the poll message; and a data receive module 806 for simultaneously receiving data from the wireless nodes during the assigned transmission opportunity.

Figure 9:
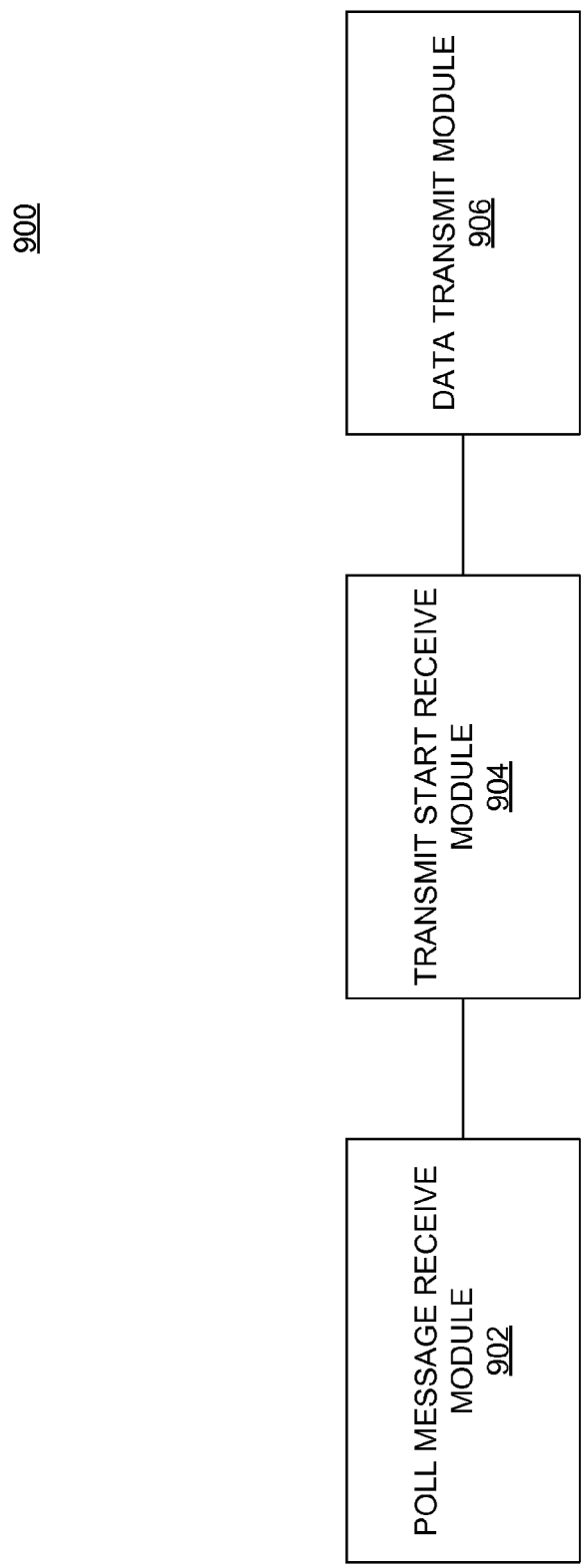
FIG. 9 is a block diagram illustrating the functionality of an AT apparatus for implementing a client-initiated UL scheme for a plurality of ATs in accordance with one aspect of the disclosure.

FIG. 9 is a diagram illustrating the functionality of an access terminal apparatus 900 in accordance with one aspect of the disclosure. The apparatus 900 includes a poll message receive module 902 for receiving a poll message including a solicitation for a request to transmit data via uplink; a transmit start receive module 904 for receiving a transmit start message indicating an assignment of a simultaneous transmit opportunity; and a data transmit module 906 for simultaneously transmitting data via uplink in accordance with the simultaneous transmit opportunity.

Figure 10:
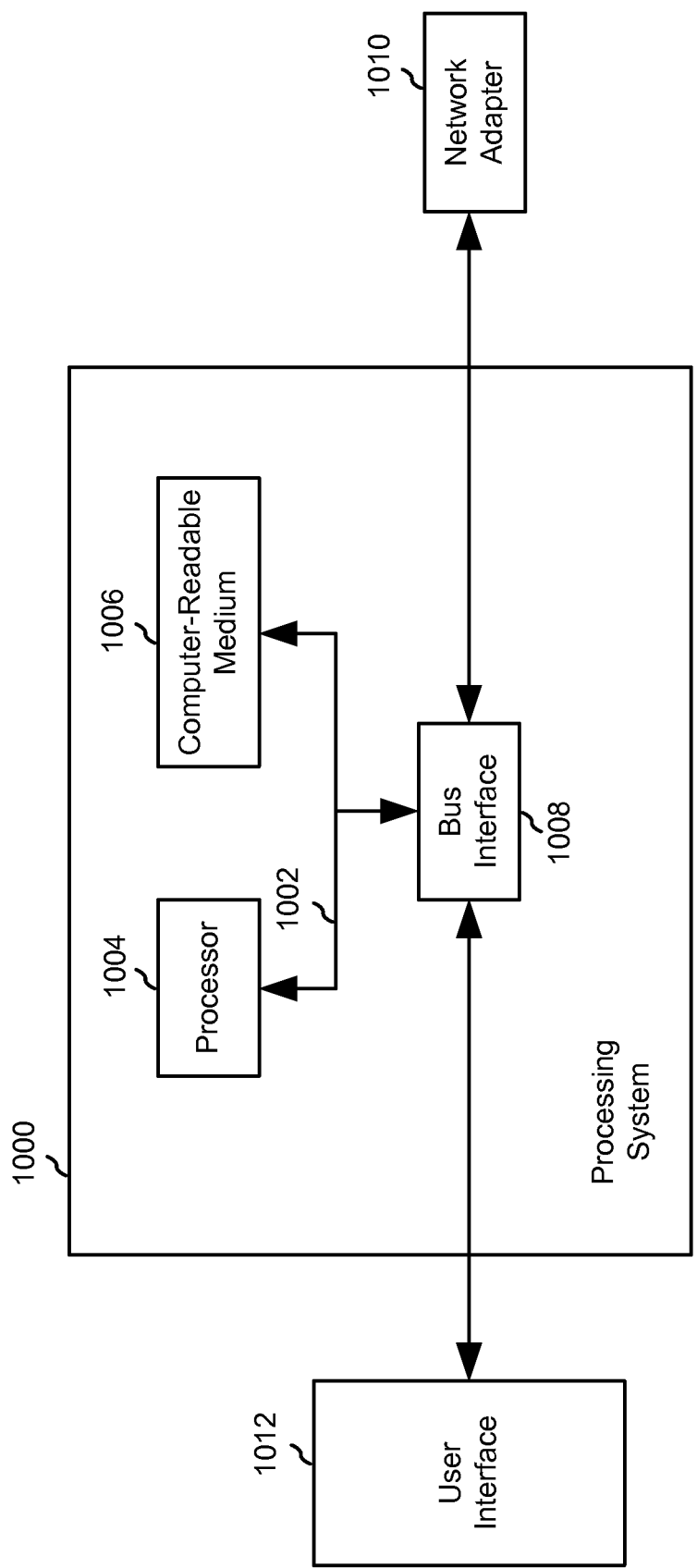
FIG. 10 is a block diagram of an apparatus that includes a processing system.

FIG. 10 illustrates an example of a hardware configuration for a processing system 1000 in a wireless node (e.g., AP 110 and AT 120). In this example, the processing system 1000 may be implemented with a bus architecture represented generally by bus 1002. The bus 1002 may include any number of interconnecting buses and bridges depending on the specific application of the processing system 1000 and the overall design constraints. The bus links together various circuits including a processor 1004, computer-readable media 1006, and a bus interface 1008. The bus interface 1008 may be used to connect a network adapter 1010, among other things, to the processing system 1000 via the bus 1002. The network interface 1010 may be used to implement the signal processing functions of the PHY layer. In the case of an access terminal 120 (see FIG. 1), a user interface 1012 (e.g., keypad, display, mouse, joystick, etc.) may also be connected to the bus via the bus interface 1008. The bus 1002 may also link various other circuits such as timing sources, peripherals, voltage regulators, power management circuits, and the like, which are well known in the art, and therefore, will not be described any further.

The processor 1004 is responsible for managing the bus and general processing, including the execution of software stored on the computer-readable media 1006. In some embodiments, computer-readable medium 1006 may store computer executable codes such that when the codes are executed by a computer cause the computer to perform the functions described herein. The processor 1004 may be implemented with one or more general-purpose and/or special purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation illustrated in FIG. 10, the computer-readable media 1006 is shown as part of the processing system 1000 separate from the processor 1004. However, as those skilled in the art will readily appreciate, the computer-readable media 1006, or any portion thereof, may be external to the processing system 1000. By way of example, the computer-readable media 1006 may include a transmission line, a carrier wave modulated by data, and/or a computer product separate from the wireless node, all which may be accessed by the processor 1004 through the bus interface 1008. Alternatively, or in addition to, the computer readable media 1006, or any portion thereof, may be integrated into the processor 1004, such as the case may be with cache and/or general register files.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

By way of example, several aspects of telecommunication systems have been presented with reference to various apparatus and methods. These apparatus and methods have been described herein and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Further by way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The processing system, or any part of the processing system, may provide the means for performing the functions recited herein. By way of example, one or more processing systems executing code may provide the means for receiving a request to transmit data from a wireless node in a plurality of wireless nodes; and transmitting a multi-cast message to a set of wireless nodes in the plurality of wireless nodes to permit data transmission. Alternatively, the code on the computer readable medium may provide the means for performing the functions recited herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for scheduling uplink communication in a wireless network, comprising:
    receiving at an access point a client-initiated transmit request message from a first client access terminal wherein the client-initiated transmit request message includes a request to transmit data via uplink to the access point;
    in response to receiving the client-initiated transmit request message, selecting at the access point a first plurality of client access terminals other than the first client access terminal, to which to transmit a poll message;
    transmitting the poll message from the access point to the first plurality of client access terminals, the poll message including a solicitation for transmit request messages; and
    receiving by the access point a plurality of solicited transmit request messages corresponding to the poll message, from a second plurality of client access terminals among the first plurality of client access terminals.

2. The method of claim 1, further comprising:
    selecting at the access point a third plurality of client access terminals from among the first client access terminal and the second plurality of client access terminals for assignment of a first simultaneous transmit opportunity based at least in part on the received client-initiated transmit request message and the received solicited transmit request messages;
    transmitting a first transmit start message from the access point to the third plurality of client access terminals, the first transmit start message indicating the assignment of the first simultaneous transmit opportunity.

3. The method of claim 2, further comprising:
    storing by the access point an indication of at least one client access terminal, from among the first client access terminal and the second plurality of access terminals, that was not selected to be in the third plurality of client access terminals for the assignment of the simultaneous transmit opportunity.

4. The method of claim 3, further comprising:
    receiving, by the access point, data from the third plurality of client access terminals in accordance with the assignment of the first simultaneous transmit opportunity;
    transmitting a block acknowledgement message from the access point to each of the third plurality of client access terminals based at least in part on the received data; and
    transmitting a second transmit start message from the access point to a fourth plurality of client access terminals, the second transmit start message indicating an assignment of a second simultaneous transmit opportunity for each of the fourth plurality of client access terminals, the fourth plurality of client access terminals including the at least one client access terminal from among the first client access terminal and the second plurality of client access terminals not selected to be within the third plurality of client access terminals for assignment of the first simultaneous transmit opportunity.

5. The method of claim 2, further comprising:
    receiving by the access point of data from the third plurality of client access terminals in accordance with the assignment of the first simultaneous transmit opportunity; and
    transmitting a block acknowledgement message from the access point to each of the third plurality of client access terminals based at least in part on the received data.

6. The method of claim 2, wherein the poll message includes a priority class specification.

7. The method of claim 2, wherein the first transmit start message includes at least one of
    an indication of a spatial stream assigned to each of the third plurality of client access terminals,
    a priority class of data permitted to be transmitted by each of the third plurality of client access terminals,
    a time duration for data transmission by the third plurality of client access terminals, and
    a modulation and coding rate assignment to each of the third plurality of client access terminals.

8. The method of claim 2, wherein the selecting of the client access terminal for inclusion in the third plurality of client access terminals is based at least in part on at least one from among
    an amount of data to transmit reported by the client access terminal, and
    an amount of data in a queue of the client access terminal, and
    a priority class associated with the data to transmit.

9. The method of claim 2, wherein the client-initiated transmit request message is a first transmit request message, wherein the first plurality of client access terminals includes at least a second client access terminal and a third client access terminal, and wherein the solicited transmit request messages include at least a second transmit request message from the second client access terminal and a third access request message from the third client access terminal, and wherein the selecting the third plurality of access terminals selects at least one access terminal among the first client access terminal and the third client access terminal and not the second client access terminal.

10. The method of claim 1, wherein the poll message includes a schedule indicating when each of the first plurality of client access terminals is to respond with a solicited transmit request message.

11. The method of claim 10, wherein the schedule indicates a deterministic backoff value corresponding to each of the first plurality of client access terminals, wherein each deterministic backoff value is different from other of the deterministic backoff values.

12. The method of claim 11, further comprising determining at the access point a time reservation based on a largest of the deterministic backoff values multiplied by a slot time, wherein the poll message includes a duration field indicating the time reservation, and wherein the time reservation indicates a time during which solicited transmit request messages from the first plurality of client access terminals should be received.

13. The method of claim 10, wherein the schedule indicates fixed points in time.

14. The method of claim 1, wherein receiving at the access point a plurality of solicited transmit request messages comprises sequentially receiving solicited transmission request messages and concurrently comparing the received solicited transmission request messages against a given capacity to accommodate transmission requests and, when a result of the comparing indicates no more transmission requests can be accommodated, terminating receiving solicited transmission request messages.

15. The method of claim 14, wherein the method further comprises:
based at least in part on said terminating receiving solicited transmission request messages,
selecting a third plurality of client access terminals from the second plurality of client access terminals for assignment of a first simultaneous transmit opportunity based at least in part on the received solicited transmit request messages; and
transmitting a first transmit start message to the third plurality of client access terminals, the first transmit start message indicating the assignment of the first simultaneous transmit opportunity.

16. The method of claim 1, wherein at least one of the solicited transmit request messages from the second plurality of client access terminals indicates an amount of data to be communicated via uplink and a priority class of the data.

17. The method of claim 1, wherein the selecting of the first plurality of client access terminals is configured to include a client access terminal in the first plurality of client access terminals based at least in part on a response by the client access terminal to a previous poll message.

18. The method of claim 1, wherein the selecting of the first plurality of client access terminals is configured to include a client access terminal in the first plurality of client access terminals based at least in part on participation of the client access terminal in a previous transmit opportunity.

19. The method of claim 1, wherein the client-initiated transmit request message is a first transmit request message, wherein the first plurality of client access terminals includes at least a second client access terminal and a third client access terminal, and wherein the solicited transmit request messages include at least a second transmit request message from the second client access terminal and a third access request message from the third client access terminal.

20. A computer-program product, comprising:
a computer-readable non-transitory medium comprising:
code for causing a computer to receive a client-initiated transmit request message from a first client access terminal, wherein the client-initiated transmit request message includes a request to transmit data via uplink to an access point;
code for causing the computer to select, in response to receiving the client-initiated transmit request message, a first plurality of client access terminals other than the first client access terminal to which to send a poll message;
code for causing the computer to transmit the poll message from the access point to the first plurality of client access terminals, the poll message including a solicitation for transmit request messages; and
code for causing the computer to receive a plurality of solicited transmit request messages corresponding to the poll message from a second plurality of client access terminals among the first plurality of client access terminals.

21. The computer-program product of claim 20, wherein the computer-readable non-transitory medium further comprises:
code for causing the computer to select a third plurality of client access terminals from among the first client access terminal and the second plurality of client access terminals for assignment of a first simultaneous transmit opportunity, based at least in part on the received client-initiated transmit request message and the received solicited transmit request messages;
code for causing the computer to transmit a first transmit start message from the access point to the third plurality of client access terminals, the first transmit start message indicating the assignment of the first simultaneous transmit opportunity.

22. The computer-program product of claim 21, wherein the computer-readable non-transitory medium further comprises:
code for causing the computer to receive data from the third plurality of client access terminals in accordance with the assignment of the first simultaneous transmit opportunity; and
code for causing the computer to transmit from the access point a block acknowledgement message to each of the third plurality of client access terminals based at least in part on the received data.

23. The computer-program product of claim 21, wherein the computer-readable non-transitory medium further comprises:
code for causing the computer to store an indication of a transmit request message received from at least one client access terminal among the first client access terminal and the second plurality of client access terminals that was not selected to be within the third plurality of client access terminals for the first simultaneous transmit opportunity.

24. The computer-program product of claim 21, wherein the first transmit start message includes at least one of
an indication of a spatial stream assigned to each of the third plurality of client access terminals,
a priority class of data permitted to be transmitted by each of the third plurality of client access terminals,
a time duration for data transmission by the third plurality of client access terminals, and
a modulation and coding rate assignment to each of the third plurality of client access terminals.

25. The computer-program product of claim 21, wherein the selecting of the third plurality of client access terminals is based at least in part on at least one of an amount of data to transmit reported by the client access terminal, an amount of data in a queue of the client access terminal, and a priority class associated with the data to transmit.

26. The computer-program product of claim 20, wherein the poll message includes a deterministic backoff value corresponding to each of the first plurality of client access terminals to schedule when each of the first plurality of client access terminals is to respond with a solicited transmit request message, wherein each deterministic backoff value is different from other of the deterministic backoff values.

27. The computer-program product of claim 20, wherein the poll message includes a duration field indicating a time reservation during which solicited transmit request messages from the first plurality of client access terminals should be received.

28. The computer-program product of claim 20, wherein the poll message includes a priority class specification.

29. The computer-program product of claim 20, wherein at least one of the solicited transmit request messages from the second plurality of client access terminals indicates an amount of data to be communicated via uplink and a priority class of the data.

30. The computer program product of claim 20, wherein the code for causing the computer to receive a plurality of solicited transmit request messages comprises code for causing the computer to sequentially receive solicited transmission request messages and concurrently comparing the received solicited transmission request messages against a given capacity to accommodate transmission requests and, when a result of the comparing indicates no more transmission requests can be accommodated, for causing the computer to terminate receiving solicited transmission request messages.

31. The computer program product of claim 30, wherein the computer-readable non-transitory medium further comprises:

code for causing the computer to select, based at least in part on terminating receiving solicited transmission request messages, a third plurality of client access terminals from among the first client access terminal and the second plurality of client access terminals for assignment of a first simultaneous transmit opportunity, further based at least in part on the received client-initiated transmit request message and the received solicited transmit request messages;

code for causing the computer to transmit a first transmit start message from the client access point to the third plurality of client access terminals, the first transmit start message indicating the assignment of the first simultaneous transmit opportunity.

32. An apparatus for an access point, comprising:

means for receiving at the access point a client-initiated transmit request message from a first client access terminal, wherein the client-initiated transmit request message includes a request to transmit data via uplink;

means for selecting, in response to receiving the client-initiated transmit request message, a first plurality of client access terminals other than the first client access terminal to which to transmit a poll message;

means for generating the poll message, the poll message including a solicitation for solicited transmission request messages an antenna configured to transmit the poll message to the first plurality of client access terminals of a wireless network;

means for receiving solicited transmit request messages corresponding to the poll message solicitation, from a second plurality of client access terminals among the first plurality of client access terminals;

means for selecting a third plurality of client access terminals, from among the first access terminal and the second plurality of client access terminals, for assignment of a simultaneous transmit opportunity, based at least in part on the received client-initiated transmit request message and the received solicited transmit request messages; and means for generating a transmit start message indicating an assignment of a simultaneous transmit opportunity to the third plurality of client access terminals, wherein the antenna is further configured to transmit the transmit start message to the third plurality of client access terminals.

33. The apparatus of claim 32, wherein the poll message includes a schedule indicating when each of the first plurality of client access terminals is to respond with a solicited transmit request message.

34. The apparatus of claim 33, wherein the schedule includes a deterministic backoff value corresponding to each of the first plurality of client access terminals, wherein each deterministic backoff value is different from other of the deterministic backoff values.

35. The apparatus of claim 32, wherein the means for selecting is further configured to store an indication of a client access terminal, from among the first client access terminal and the second plurality of client access terminals, that was not selected to be in the third plurality of client access terminals for the assignment of the simultaneous transmit opportunity.

36. The apparatus of claim 32, wherein the transmit start message includes at least one of an indication of a spatial stream assigned to each of the third plurality of client access terminals, a priority class of data permitted to be transmitted by each of the third plurality of client access terminals, a time duration for data transmission by the third plurality of client access terminals, and a modulation and coding rate assignment for each of the third plurality of client access terminals.

37. An apparatus for scheduling uplink communication in a wireless network, comprising:

a memory;

a processor coupled with the memory and configured to:

receive a client-initiated transmit request message from a first client access terminal, wherein the client-initiated transmit request message includes a request to transmit data via uplink to an access point;

select, in response to receipt of the client-initiated transmit request message, a first plurality of client access terminals other than the first client access terminal to which to send a poll message;

transmit the poll message from the access point to the first plurality of client access terminals, the poll message including a solicitation for transmit request messages; and receive a plurality of solicited transmit request messages corresponding to the poll message from a second plurality of client access terminals among the first plurality of client access terminals.

* * * * *